United States Patent [19]

Blough et al.

[11] Patent Number: 5,736,477
[45] Date of Patent: Apr. 7, 1998

[54] INORGANIC OXIDE RESINS FOR INTERNAL OXIDATION INHIBITION OF CARBON-CARBON COMPOSITES

[75] Inventors: Amy M. Blough, Wilmington; John N. Kostas, Claymont, both of Del.

[73] Assignee: Hercules Incorporated, Wilmington, Del.

[21] Appl. No.: 355,216

[22] Filed: May 22, 1989

[51] Int. Cl.$^6$ .................................. C04B 35/563
[52] U.S. Cl. .................. 501/99; 264/29.5; 264/29.7; 264/60; 252/187.13
[58] Field of Search .................. 501/99; 264/29.5, 264/29.7, 60; 252/183.13

[56] References Cited

U.S. PATENT DOCUMENTS

| | | | |
|---|---|---|---|
| 3,477,868 | 11/1969 | Grundschober et al. | 117/46 |
| 3,706,596 | 12/1972 | Wallouch | 501/99 |
| 4,152,509 | 5/1979 | Yajima et al. | 528/4 |
| 4,248,814 | 2/1981 | Yajima et al. | 264/63 |
| 4,267,211 | 5/1981 | Yajima et al. | 427/228 |
| 4,269,391 | 5/1981 | Saito et al. | 251/315 |
| 4,279,654 | 7/1981 | Yajima et al. | 501/2 |
| 4,395,299 | 7/1983 | Riggs et al. | 264/29.5 |
| 4,735,858 | 4/1988 | Hosokawa et al. | 427/389 |
| 4,795,677 | 1/1989 | Gray | 428/246 |
| 5,067,999 | 11/1991 | Streckert et al. | 156/89 |
| 5,206,327 | 4/1993 | Matsumoto et al. | 528/4 |
| 5,298,311 | 3/1994 | Bentson et al. | 428/216 |
| 5,618,766 | 4/1997 | Leiser et al. | 501/87 |

FOREIGN PATENT DOCUMENTS

| | | | |
|---|---|---|---|
| 2254723 | 11/1972 | Germany | 501/99 |
| 1365845 | 9/1974 | United Kingdom . | |

OTHER PUBLICATIONS

H. Wada et al., The Synthesis of Boron Nitride and Boron Carbide by Pyrolysis of Boric Acid/1, 2, 3—Propanetriol Condensation Product, Chemistry Letters, pp. 691–692, 1985.

*Primary Examiner*—Edward A. Miller
*Attorney, Agent, or Firm*—Mark Goldberg

[57] ABSTRACT

Disclosed is a liquid, boron-containing, inorganic oxide resin containing unsaturated organic groups. The resin can additionally comprise the units $-[M-O]-$, where M can vary from one unit to the next and is selected from Si, Ti, Al, Ba, Zr, Li and Hf. Also disclosed is a process for inhibiting the oxidation of carbon-carbon composites by impregnating the composite with such resins, cross-linking the resin and pyrolyzing to convert the resin to a ceramic material.

6 Claims, No Drawings

INORGANIC OXIDE RESINS FOR INTERNAL OXIDATION INHIBITION OF CARBON-CARBON COMPOSITES

FIELD OF THE INVENTION

This invention relates to inorganic oxide resins. This invention particularly relates to liquid, boron-containing resins having polymerizable side chains, which are useful for internal oxidation inhibition of carbon-carbon composites.

BACKGROUND OF THE INVENTION

The use of carbon-carbon (C/C) composite materials in aerospace and advanced turbine engine applications is limited by their inherent reactivity toward oxygen. In the past, ceramic and glass coating systems have been studied as oxygen barriers, but no system has been proven fully satisfactory in protecting C/C structures from oxidation under extreme conditions.

The primary problem encountered in protecting C/C composites is the difference in thermal expansion between the substrate and protective coatings, poor coating adhesion, and chemical incompatibility between the coating and substrate. The commonly accepted approach to protection up to 2000° C. consists of a multilayered system combining a topcoat of refractory ceramic, an underlayer of glass-forming material, and internal inhibition of the carbon matrix. The ceramic top layer cracks as the composite is thermally stressed, exposing the underlayer to oxidation and forming a glass that flows to seal the cracks and prevent further oxygen penetration. In the case of catastrophic failure of the external coating, matrix inhibition will provide protection in much the same way as the underlayer coating. Matrix inhibition also plays an important role in protection at lower temperature regimes when the underlayer can become depleted.

The most common approach to matrix inhibition of carbon composites is incorporation of particulate ceramic materials into the matrix. These may either be added by sprinkling the particulate between each layer of a two dimensional composite prior to densification, or the particulates can be added as part of the impregnating medium. There are several disadvantages to the use of particulates for internal inhibition. Agglomeration of particles occurs in the matrix to yield a nonhomogeneous dispersion of protective materials. This results in excessive oxidation of the carbon matrix and requires a relatively high loading of inorganic material. Intimate mixing of different molecular species is also reduced due to this agglomeration. When a complex glass is desired upon oxidation, this lack of mixing may prevent formation of the desired species. Another potential problem results from stresses induced in processing. Particulates have been found to cause fiber damage in some two dimensional structures. Finally, uniform infiltration of particulates into a three dimensional composite structure is difficult because of the closely woven construction.

Boron compounds are currently being incorporated into carbon matrices as oxidation inhibitors, for example, as described in U.S. Pat. No. 4,795,677 to Gray. Oxidation of these compounds forms glass-like materials which provide protection of the carbonaceous matrix. Although other oxides protect carbon from oxidation, boron oxides have the most beneficial combination of good wetting characteristics, formation at low temperature and appropriate viscosity to flow and seal cracks formed during coating failure. Despite these and other beneficial characteristics, the use of borate glasses has several disadvantages. Water sensitivity and low viscosity at high temperatures lead to loss of the borate glass. If the external coating fails, this loss would result in further oxidation of the matrix and inhibitor to form replacement borate glass. Continual degradation of the matrix in this manner ultimately results in loss of mechanical properties.

Boron and borosiloxane polymers that can be used as ceramic precursors have been prepared, although their use for the oxidation protection of carbon-carbon composites has not been suggested. For example, H. Wada et al., Chemistry Letters, pp. 691–692, 1985, describe the preparation of boron nitride and boron carbide by pyrolysis of the condensation product of boric acid/1,2,3-propanetriol under an inert atmosphere. Control of the atmosphere determines the ceramic formed. U.S. Patent 3,477,868 (Batelle Memorial Institute) describes production of surface coatings from polymers containing boron and silicon substituted in part by organic radicals such as alkyl, aryl, alkoxy and acyl groups. Pyrolysis under an inert gas yields a protective layer. British Patent 1,365,845 discloses a method for production of a phenolic resin by reacting aryl borates and formaldehyde. A more heat resistant polymer is produced upon polymerization. U.S. Pat. No. 4,152,509 (The Foundation: The Research Institute for Special Inorganic Materials) discloses the production of borosiloxane polymers by heating a boric acid compound with phenylsilane to effect polycondensation. U.S. Pat. No. 4,248,814 (The Foundation: The Research Institute for Special Inorganic Materials) reveals a process for producing a ceramic material by combining a polycarbosilane polymer with a known amount of a borosiloxane that contains phenyl groups in at least a part of the side chains of silicon. The polymer mixture is used as a sintering agent in combination with a ceramic powder. All of these boron-containing polymers are solids at room temperature.

SUMMARY OF THE INVENTION

A method has now been found for preparing liquid, boron-containing, inorganic oxide resins with polymerizable side chains that can be used to impregnate carbon-carbon composites. Pyrolysis of these resins produces either glass-like or ceramic-like materials suitable for oxidation inhibition of carbon-carbon composites. The viscosity of the resin as well as the proportion and variety of inorganic elements can be varied in order to produce the combination of properties required for the desired end use. The liquid inorganic oxide resin comprises the units

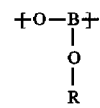

where R is derived from an unsaturated diol or triol. The resin may additionally comprise the units $+\!O\!-\!M\!+\!$ where M can vary from one unit to the next and is selected from the group consisting of Si, Ti, Al, Ba, Li, Zr and Hf. Also disclosed is a process for inhibiting the oxidation of carbonaceous materials by impregnating the material with such resins.

DETAILED DESCRIPTION OF THE INVENTION

The borate ester resins of this invention are liquids at or near room temperature and are prepared by reacting boric acid or a boric acid source such as $B_2O_3$, with a suitable unsaturated diol or triol at a temperature of 110°–150° C. Avoiding the use of a catalyst and keeping the temperature within the specified range results in the production of a low molecular weight resin suitable for coating or impregnation applications. The water that is formed during the reaction is removed to prevent self-condensation reactions. Resins of varying molecular weight and viscosity can be prepared by varying the boric acid/alcohol ratio. Generally a diol is preferred rather than a triol, since excessive cross-linking and formation of solid polymers often result from the use of a triol. Suitable unsaturated polyols include, but are not limited to, butenediol and 3-allyloxy-1,2-propanediol. Epoxy compounds such as 2,3-epoxypropyl acrylate, allyl glycidyl ether, 1,2-epoxy-5,9-cyclododecadiene, 1,2-epoxy-5-hexene and butadiene monoxide can also be used, since the epoxy group hydrolyzes or reacts with boric acid to form a diol. 3-Allyloxy-1,2-propanediol is preferred.

The borate resins can be used alone for treatment of carbon bodies or can serve as precursors for inorganic oxide resins in which metals are incorporated into the borate ester backbone. A preferred class of inorganic resin is a borosiloxane resin containing –[O-Si-]–units in addition to the borate ester units disclosed above. Such resins are prepared by reacting the unsaturated borate ester resin with a silane having the formula R'Si(OR")$_3$ or R'$_2$Si(OR")$_2$ where R' is an alkyl or alkenyl group and (OR") is an alkoxide linkage. The reaction is carried out at the reflux temperature of the silane and the alcohol that is formed is removed. Suitable silanes include, but are not limited to, methyltrimethoxysilane, dimethyldimethoxysilane, vinyltrimethoxysilane and methacryloxytrimethoxysilane.

Other inorganic oxide resins comprising –[O-M-]–units in which M can vary from one unit to the next and is selected from the group consisting of Si, Ti, Al, Ba, Li, Zr and Hf can also be prepared. For example, an inorganic resin containing –[O-Ti-]–units in addition to –[O-Si-]–units and unsaturated borate ester units can be prepared by reacting the borosiloxane resin described above with a titanium alkoxide such as titanium (bis-2,4-propanedionate) (diisopropoxide) or titanium [bis[4-(2-phenyl)propyl-2]-phenolato ] [oxoethlenediolato]. In the latter case the oxoethylenediolato ligand is the reactive moiety in the reaction. Theoretically such reagents as tetra-alkoxy titanates could also be used, but experience has shown that due to the high reactivity of these compounds, hydrolysis of the titanate often occurs very rapidly to produce titanium dioxide and oligomeric titanium oxide species rather than the preferred co-hydrolysis. In addition, any titanium incorporation into the mixed system in this form would be potentially highly cross-linked and/or remain very reactive.

Al, Ba, Zr, Li and Hf can be introduced into the resin by means of similar hydrolysis and condensation reactions. Oxygen-containing compounds of any of these metals can be used to incorporate the metals into the resin, e.g., aluminum sec-butoxide, aluminum isopropoxide, and barium acetylacetonate.

The proportion of boron and the other inorganic elements in the resin can be varied, depending upon the properties desired and the temperature regime to which the oxidation inhibited composite will be subjected. The choice of the metals introduced into the resin will influence the properties of the glass that is ultimately formed, e.g., its viscosity, melting point, and thermal expansion characteristics. Resins rich in boron are preferred for use at temperatures less than 1100° C. and silicon-rich resins are preferred at temperatures higher than 1100° C. Borosiloxane resins, B/Si/Ti resins, and B/Si/Ti/Al resins rich in either boron or silicon can be prepared.

The low viscosity inorganic resin will undergo addition polymerization in the presence of a catalyst, heat, radiation or combinations thereof to produce a high viscosity, cross-linked material. The high viscosity material, which is a solid at room temperature, can be either a thermoset or a thermoplastic depending on the side chain used. The cross-linked resin can be pyrolyzed to produce a ceramic or a glass, depending upon the temperature and atmosphere selected. In an inert atmosphere, such as nitrogen or argon, at temperatures below 1200° C., amorphous mixed oxides are produced. Some carbon containing species are also present. At temperatures greater than 1200° C., carbothermal reduction occurs to produce mainly carbides, free carbon and amorphous material. Elemental analysis, while somewhat questionable for ceramic materials, indicates a low oxygen content suggestive of non-oxide ceramic formation after high temperature pyrolysis. Pyrolysis in air leads to the formation of the corresponding oxides only, as indicated by detection of only trace mounts of carbon after elemental analyses.

The advantage realized by the use of such polymerizable borate ester resins is the ability to synthesize a low viscosity inorganic resin that will provide more uniform infiltration and oxidation protection of carbon-carbon composites without the problems associated with the use of particulates. In addition, after cross-linking and subsequent pyrolysis, the resin provides a higher ceramic yield than the uncross-linked borate ester and also increases the ceramic yield of other materials into which it is incorporated, e.g., the matrix of a carbon-carbon composite. For instance, a pentanediol borate ester exhibits a ceramic yield of 16% upon pyrolysis in nitrogen, while the allyloxy-1,2-propanediol borate ester after curing with 2% dicumyl peroxide exhibits a ceramic yield of 27%.

When the low viscosity, inorganic oxide resins of this invention are used for the internal inhibition of carbon-carbon composites, the uncross-linked resin is mixed with a carbon source such as petroleum pitch, and a suitable curing catalyst, and placed in a reactor vessel along with the carbon fiber preform. The preform is impregnated under vacuum and the composite is heated to a temperature sufficient to cure the resin, typically 125°–175° C. The composite is then subjected to additional heating under pressure, typically 500–1500 psig, in an inert atmosphere to carbonize the carbon source and decompose the resin. The temperature used will depend upon various factors such as the type of carbon source used and what metals are present in the resin and can be readily determined by one skilled in the art. When petroleum pitch is used as the carbon source, the temperature is typically about 500° C. In the final step, the composite is removed from the reactor and pyrolyzed at atmospheric pressure in a non-oxidizing atmosphere to convert the resin to a ceramic material and graphitize the carbon source. The pyrolysis temperature is generally about 1500°–2300° C.

EXAMPLE 1

Preparation of Borate Ester Resin

Boric Acid (666.5 g, 10.78 moles) and 2136.8 g (16.17 moles) 3-allyloxy-1,2-propanediol are charged into a round bottom flask equipped with stirrer, thermocouple, nitrogen inlet, condenser and moisture trap. The reaction mixture is heated to 110° C. with vigorous nitrogen flow over the surface and water produced during the condensation reaction is removed. After condensation is completed, the polymer is heated to approximately 175° C. to effect partial cross-linking. After cooling, 469.9 grams of water and 2326.5 g of a pale yellow, liquid resin are collected.

EXAMPLE 2

Preparation of Silicon-Rich Borosiloxane Resin

A borate ester of 3-allyloxy-1,2-propanediol (1333 g) prepared as described in Example 1 and 1000 grams (7.341 moles) of methyltrimethoxysilane are charged into a round bottom flask equipped with stirrer, thermocouple, nitrogen inlet, condenser and moisture trap. The reaction mixture is heated at 110° C. for 4 hours with vigorous nitrogen flow over the surface. After cooling to room temperature, 2219.4 grams of a clear, liquid resin are obtained.

EXAMPLE 3

Preparation of Boron-Rich Borosiloxane Resin

The borate ester of 3-allyloxy-1,2-propanediol (1676.1 g) prepared as described in Example 1 and 72.9 grams (0.535 moles) of methyltrimethoxysilane, are charged into a round bottom flask equipped with stirrer, thermocouple, nitrogen inlet, condenser and moisture trap. The reaction mixture is heated at 110° C. for 4 hours with vigorous nitrogen flow over the surface. The temperature briefly rises to 148° C. before heating is discontinued. After cooling to room temperature, 1704.96 grams of a clear, liquid resin are obtained.

EXAMPLE 4

Silicon-Rich Titanium/Borosiloxane Resin

A silicon-rich borosiloxane resin prepared as described in Example 2 (68.3) g), is placed in a round bottom flask. Titanium (bis-2,4-propanedionate) (diisopropoxide) (1.5 ml of a 75% solution) is added and the reaction flask is cooled in ice. The titanate is hydrolyzed by adding 1.5 ml water to the cold reaction mixture. The mixture is brought to room temperature and stirred vigorously to ensure mixing of the water. A vigorous sparge of nitrogen is then applied to aid in removal of volatile species. The reaction is halted after stirring overnight, and a clear orange viscous liquid is collected (67.2 g).

EXAMPLE 5

Silicon-Rich B/Si/Ti/Al Resin

To 67.2 g of the B/Si/Ti resin prepared as described in Example 4 are added 1.5 g of a 95% by weight solution of aluminum sec-butoxide in sec-butoxide (0.0058 moles aluminum reagent) with 100 ml of toluene. The reaction mixture is refluxed at approximately 110° C. for 16 hours and then cooled. After cooling, the toluene is distilled away from the product to produce an amber gel. The gel is difficult to remove from the reaction vessel and a final weight is not obtained.

EXAMPLE 6

Boron-Rich B/Si/Ti/Al Resin

The borate ester polymer prepared as described in Example 1 (150 grams) is charged to a reaction vessel. Methyltrimethoxysilane (6.53 g, 0.0492 moles) is added and the mixture is refluxed between 90° and 110° C. for 3 hours. After cooling, 23.9 g of of 75% titanium (bis-2,4-propanedionate) (diisopropoxide) (0.0492 moles of actual titanium reagent) is added via syringe. Once the reaction has been cooled further in ice, 0.89 ml of water is added. The reaction mixture is stirred overnight at room temperature. A toluene solution of aluminum sec-butoxide (25.5 g) (0.0983 moles of actual aluminum sec-butoxide) is added and the resultant yellow mixture is refluxed at ~115° C. for 22 hours. After cooling, the condenser is replaced with a distillation apparatus and excess solvent is removed under atmospheric pressure. The resin is then heated to ~150° C. for 1 hour to promote further condensation. The final yield is 183.9 g of a yellow, liquid resin.

EXAMPLE 7

Borate ester of 2,3-Epoxypropyl Acrylate

Boric acid (38.2 grams, 0.62 moles), 2,3-epoxypropyl acrylate (118.7 g, 0.927 moles) and benzoquinone (0.47 g) are added to a round bottom flask equipped with a condenser, and a moisture trap. The reaction mixture is heated to 110° C., at which point an exotherm occurs. The reaction temperature is allowed to rise to 140° C. but not above (heating above this temperature results in the production of an intractable material). An ice bath is used to control the exotherm. A biphase distillate is collected, indicative of water and some unreacted 2,3-epoxypropyl acrylate. After the exotherm is complete, the reaction is held at 110° C. for approximately 0.5 hours to ensure complete reaction. An orange, opaque, viscous resin is obtained after cooling (154.12 g).

EXAMPLE 8

Borosiloxane Resin with Acrylate Side Groups

Boric acid (60.6 grams, 0.98 moles), 2,3-epoxypropyl acrylate (188.11 g, 1.47 moles) and benzoquinone (0.75 g) are added to a round bottom flask equipped with a condenser and a moisture trap. The reaction mixture is heated to 110° C., at which point an exotherm occurs. The reaction temperature is allowed to rise to 140° C. but not above (heating above this temperature results in an intractable material). After the exotherm is complete, the reaction mixture is held at 100° C. to ensure complete reaction. An orange, opaque, viscous product is obtained upon cooling. In the same reaction vessel, 45.4 ml (43.3 g, 0.317 moles) of methyltrimethoxy-silane are introduced via syringe. Additional benzoquinone is added to prevent any possible polymerization of the acrylate side group during heating. The reaction mixture is returned to reflux at 110° C. for 3 hours. Cooling yields 261.44 g of a burgundy, liquid resin.

EXAMPLE 9

Incorporation of Titanium into

Acrylate-Modified Borosiloxane Resins

Boric acid (44.7 grams, 0.723 moles), 2,3-epoxypropyl acrylate (138.7 g, 1.08 moles) and benzoquinone (0.4% of epoxypropyl acrylate weight) are added to a round bottom flask equipped with a condenser and a moisture trap. The reaction mixture is heated to 110° C. at which point an exotherm occurs. The reaction temperature is allowed to rise to 140° C. but not above (heating above this temperature results in an intractable material). After the exotherm is complete, the reaction is held at 110°–115° C. for 1 hour to ensure complete reaction. An orange, opaque, viscous product is obtained upon cooling. In the same reaction vessel, 32.8 g (0.241 moles) of methyltrimethoxysilane is introduced via syringe. Additional benzoquinone is added (0.4% by weight of epoxypropyl acrylate) to prevent any possible polymerization of the acrylate side groups during heating. The reaction mixture is returned to reflux at 110°–115° C. for 1.5 hours. Still in the same flask, 58.5 ml of a 75% solution of titanium (bis-2,4-propanedionate) (diisopropoxide) (0.241 moles of titanium reagent) are added via syringe to the borosiloxane resin. After cooling in ice, water (2.17 ml, 0.12 moles) is added to effect hydrolysis. A vigorous nitrogen sparge is continued to encourage volatilization of low molecular weight materials. After stirring overnight, 224.9 g of a clear, dark orange, liquid resin are obtained.

EXAMPLE 10

Preparation of Inhibited 3-D Carbon/Carbon Test Coupons

A three dimensional carbon fiber preform (45% fiber volume, density 0.85 g/cc) weighing 54.8 g is charged to a glass-lined high pressure tube reactor. A slurry consisting of 225 g silicon-rich borosiloxane resin, prepared as described in Example 2, and 67.5 g ground Ashland A 400 petroleum pitch is then charged to the vessel. The borosiloxane resin contains 2% by weight of dicumyl peroxide curing catalyst. The reactor is sealed and pressure-tested to 1000 psig.

The vessel is evacuated to 30" Hg for ½ hour, then brought back to atmospheric pressure. The vessel is heated to 150° C. and held at that temperature for one hour in order to cure the resin. The vessel is again evacuated to 30" Hg and heated to 250° C. and held at this temperature for one hour. The reactor is then heated to 320° C. under vacuum and held at this temperature for one hour. This temperature is the approximate temperature of the minimum viscosity for the pitch. The pitch and other volatiles are trapped in a dry ice/acetone trap and saved for analysis (weight: 74 g). The pressure is then brought first to atmospheric, then increased approximately 50 psig per minute through a flow control valve to a maximum of 800 psig using nitrogen. The reactor is held at 320° C. and 800 psig for one hour, then heated at approximately 2°–3° C. per minute to 500° C., and held at this temperature for an additional hour. The vessel is allowed to cool to room temperature under pressure. The pressure is then vented to atmospheric, and the vessel is emptied. The carbon/carbon composite is scraped to removed the excess matrix and weighed. The is 81.4 g.

The composite is then charged to a high temperature Lindburg tube furnace and fired to approximately 1500° C. under flowing argon. The temperature is increased from room temperature to 1500° C. over a six hour period, and held at 1500° C. for one hour. One final weight of the composite is 70.8 g.

The impregnation and firing procedure described above is repeated eight times to give a final weight of 88.8 g, corresponding to a final density of 1.4 g/cc.

The composite is then machined into oxidation coupons approximately 1"×2"×0.2" in size and coated with a proprietary coating. The coated coupons are oxidation tested using a simulated jet engine cycle, the so called "modified McDonnell Douglas test cycle", which is described below.

A coated coupon prepared as described above and weighing 9.07 g is placed in a tube furnace at 1371° C. (2500° F.) in air and held there for one hour. The sample is removed and held at room temperature for ¼ hour and reinserted into the furnace at 1371° C. This cycle is repeated four times for a total time of four hours at 1371° C. The coupon weight is 9.08 g. The coupon is then placed in a box oven at 649° C. (1200° F.) in air and held there for 16 hours. The coupon weight is 9.0357 g. This procedure constitutes one full oxidation cycle. The procedure is repeated for a total of five cycles or 100 hours oxidation testing. The weight of the coupon at various points in the test cycle is given in Table 1.

TABLE 1

| Hours of Testing | Weight, g |
| --- | --- |
| 20 | 9.0357 |
| 24 | 9.0349 |
| 40 | 8.9528 |
| 44 | 8.9522 |
| 60 | 8.8932 |
| 64 | 8.8920 |
| 80 | 8.8030 |
| 84 | 8.7919 |
| 100 | 8.6671 |

The total weight loss after 100 hours testing is 4.4%, compared to 38% for a coupon prepared without impregnation of the carbon fiber preform with the borosiloxane resin and coated with the same proprietary coating.

What we claim and desire to protect by Letters Patent is:

1. A process for the internal oxidation inhibition of a carbon/carbon composite, said process comprising
   (a) impregnating a carbonaceous material with a mixture of a carbon source, a liquid borate ester resin comprising the units

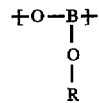

where R is derived from an unsaturated diol or triol, and a suitable curing catalyst for the borate ester resin,
   (b) heating to a temperature sufficient to cure the borate ester resin,
   (c) heating under pressure in an inert atmosphere to a temperature sufficient to carbonize the carbon source, and
   (d) heating in an inert atmosphere at atmospheric pressure to a temperature of from about 1500° to about 2300° C. to convert the borate ester resin to a ceramic material and graphitize the carbon source.

2. The process of claim 1 wherein the borate ester resin additionally comprises the units ${-}[\text{O-M}]{-}$ where M can vary from one unit to the next and is selected from the group consisting of Si, Ti, Al, Ba, Zr, Li and Hf.

3. A carbonaceous material impregnated with a liquid borate ester resin comprising the units

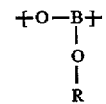

where R is derived from an unsaturated diol or triol.

4. The material of claim 3 wherein the liquid borate ester resin additionally comprises the units ${-}[\text{O-M}]{-}$ where M can vary from one unit to the next and is selected from the group consisting of Si, Ti, Al, Ba, Zr, Li and Hf.

5. An oxidation inhibited carbon/carbon composite prepared by the process of claim 1.

6. An oxidation inhibited carbon/carbon composite prepared by the process of claim 2.

* * * * *